United States Patent
Park et al.

(10) Patent No.: US 11,988,351 B1
(45) Date of Patent: May 21, 2024

(54) LAMP FOR VEHICLE AND VEHICLE INCLUDING THE SAME

(71) Applicant: SL Corporation, Daegu (KR)

(72) Inventors: Jong Ryoul Park, Auburn Hills, MI (US); Michael Luketich, Auburn Hills, MI (US)

(73) Assignee: SL Corporation, Daegu (KR)

( * ) Notice: Subject to any disclaimer, the term of this patent is extended or adjusted under 35 U.S.C. 154(b) by 30 days.

(21) Appl. No.: 18/332,937

(22) Filed: Jun. 12, 2023

(51) Int. Cl.
| | |
|---|---|
| *F21S 41/20* | (2018.01) |
| *F21S 41/143* | (2018.01) |
| *F21Y 105/16* | (2016.01) |
| *F21Y 115/10* | (2016.01) |

(52) U.S. Cl.
CPC .......... *F21S 41/285* (2018.01); *F21S 41/143* (2018.01); *F21S 41/28* (2018.01); *F21Y 2105/16* (2016.08); *F21Y 2115/10* (2016.08)

(58) Field of Classification Search
CPC ......... F21S 41/285; F21S 41/28; F21S 41/143
See application file for complete search history.

(56) References Cited

U.S. PATENT DOCUMENTS

| | | | |
|---|---|---|---|
| 2015/0168780 A1* | 6/2015 | Ohno | G02F 1/133602 349/61 |
| 2017/0329073 A1* | 11/2017 | Liu | G02B 6/0053 |
| 2019/0082151 A1* | 3/2019 | Kishimoto | H04N 9/3105 |
| 2020/0032977 A1* | 1/2020 | Toko | G02F 1/13471 |
| 2020/0032978 A1* | 1/2020 | Toko | G02F 1/134327 |
| 2020/0217472 A1* | 7/2020 | Toko | F21S 41/321 |

* cited by examiner

*Primary Examiner* — Christopher E Dunay
(74) *Attorney, Agent, or Firm* — United One Law Group LLC; Kongsik Kim; Jhongwoo Peck

(57) ABSTRACT

A lamp for the vehicle includes a light source part including a plurality of light sources, a diffuser lens disposed in front of the light source part in a light traveling direction, a first polarizing film disposed in front of the diffuser lens in the light traveling direction, a second polarizing film disposed in front of the first polarizing film in the light traveling direction, a display object disposed between the first polarizing film and the second polarizing film, and a protective lens disposed in front of the second polarizing film in the light traveling direction. The first polarizing film includes a plurality of first slits that extend in a first direction, and the second polarizing film includes a plurality of second slits that extend in a second direction.

17 Claims, 12 Drawing Sheets

LAMP FOR VEHICLE AND VEHICLE INCLUDING THE SAME

TECHNICAL FIELD

The present disclosure herein relates to a lamp for a vehicle and a vehicle including the same, and more particularly, to a lamp for a vehicle, which is capable of displaying various images, and a vehicle including the same.

RELATED ART

A lamp for a vehicle is installed in a vehicle and is used to secure a driver's sight. The lamp for the vehicle may be classified in various manners depending on the installation position and purpose. For example, a headlamp may be installed on the front end of the vehicle to secure forward sight. A rear lamp may be installed on the rear end of the vehicle to transmit a signal to vehicles behind. A lamp installed on the sides of the vehicle and having a function of guiding a passenger to a boarding position is also used.

SUMMARY

The present disclosure provides a lamp for a vehicle, which is capable of selectively display various images, and a vehicle including the same. The present disclosure also provides a lamp for a vehicle, which is capable of expressing a desired three-dimensional shape, and a vehicle including the same. The present disclosure also provides a lamp for a vehicle, which is capable of displaying only a desired pattern and hiding a light source and a lens, and a vehicle including the same. The present disclosure also provides a lamp for a vehicle, which is capable of being manufactured at a lower cost, and a vehicle including the same.

The object of the present disclosure is not limited to the aforesaid, but other objects not described herein will be clearly understood by those skilled in the art from descriptions below.

An embodiment of the present disclosure provides a lamp for a vehicle, which may include a light source part including a plurality of light sources; a diffuser lens disposed in front of the light source part in a light traveling direction; a first polarizing film disposed in front of the diffuser lens in the light traveling direction; a second polarizing film disposed in front of the first polarizing film in the light traveling direction; a display object disposed between the first polarizing film and the second polarizing film; and a protective lens disposed in front of the second polarizing film in the light traveling direction. The first polarizing film may include a plurality of first slits that extend in a first direction, and the second polarizing film may include a plurality of second slits that extend in a second direction different from the first direction.

In an embodiment, each of the plurality of light sources may include a light emitting diode (LED).

In an embodiment, the light source part may further include a substrate that supports the plurality of light sources, and the plurality of light sources may be disposed to be spaced apart from one another on the substrate in the first direction and the second direction.

In an embodiment, the diffuser lens may include a lenticular lens.

In an embodiment, the plurality of first slits may be disposed to be spaced apart from one another in the second direction, and the plurality of second slits may be disposed to be spaced apart from one another in the first direction.

In an embodiment, the display object may include polycarbonate (PC), polymethyl methacrylate (PMMA), or glass.

In an embodiment, the lamp may further include a translucent film disposed in front of the protective lens in the light traveling direction.

In an embodiment, the display object may have a vehicle front grill structure, and the vehicle front grill structure may include a plurality of apertures that pass through the display object in a third direction that is perpendicular to the first direction and the second direction. In an embodiment, the protective lens may be spaced apart from the diffuser lens in the third direction by a first length, and a thickness of the display object in the third direction may be equal to a second length, where a difference between the first length and the second length may be about 0.1 mm to about 0.5 mm.

In an embodiment, the diffuser lens may have a surface area greater than a surface area of a region on which the plurality of light sources are disposed.

In an embodiment, the display object may have a surface area less than a surface area of the diffuser lens.

In an embodiment, the lamp may further include a first privacy film disposed between the diffuser lens and the first polarizing film, and the first privacy film may include a horizontal protective film. In an embodiment, the lamp may further include a second privacy film disposed between the diffuser lens and the first privacy film, and the second privacy film may include a vertical protective film.

In an embodiment of the present disclosure, a lamp for a vehicle may include a light source part including a light source; a diffuser lens disposed in front of the light source part in a light traveling direction; a first polarizing film disposed in front of the diffuser lens in the light traveling direction, the first polarizing film including a plurality of first slits that extend in a first direction; a second polarizing film disposed in front of the first polarizing film in the light traveling direction, the second polarizing film including a plurality of second slits that extend in a second direction different from the first direction; and a display object disposed between the first polarizing film and the second polarizing film. The display object may include a vehicle front grill structure that includes a plurality of apertures that pass through the display object in a third direction that is perpendicular to the first direction and the second direction.

In an embodiment, the plurality of apertures may be disposed to be spaced apart from one another in the first direction and the second direction.

In an embodiment of the present disclosure, a vehicle may include a vehicle body; and a lamp for a vehicle, which is coupled to the vehicle body. In particular, the lamp for the vehicle may include a light source part including a light source; a diffuser lens disposed in front of the light source part in a light traveling direction; a first polarizing film disposed in front of the diffuser lens in the light traveling direction, the first polarizing film including a plurality of first slits that extend in a first direction; a second polarizing film disposed in front of the first polarizing film in the light traveling direction, the second polarizing film including a plurality of second slits that extend in a second direction different from the first direction; and a display object disposed between the first polarizing film and the second polarizing film.

In an embodiment, the lamp for the vehicle may be coupled to a front end of the vehicle body.

Particularities of other embodiments are included in the detailed description and drawings.

BRIEF DESCRIPTION OF THE DRAWINGS

The accompanying drawings are included to provide a further understanding of the disclosure, and are incorporated in and constitute a part of this specification. The drawings illustrate embodiments of the present disclosure and, together with the description, serve to explain principles of the present disclosure. In the drawings.

DETAILED DESCRIPTION

Figure 1:
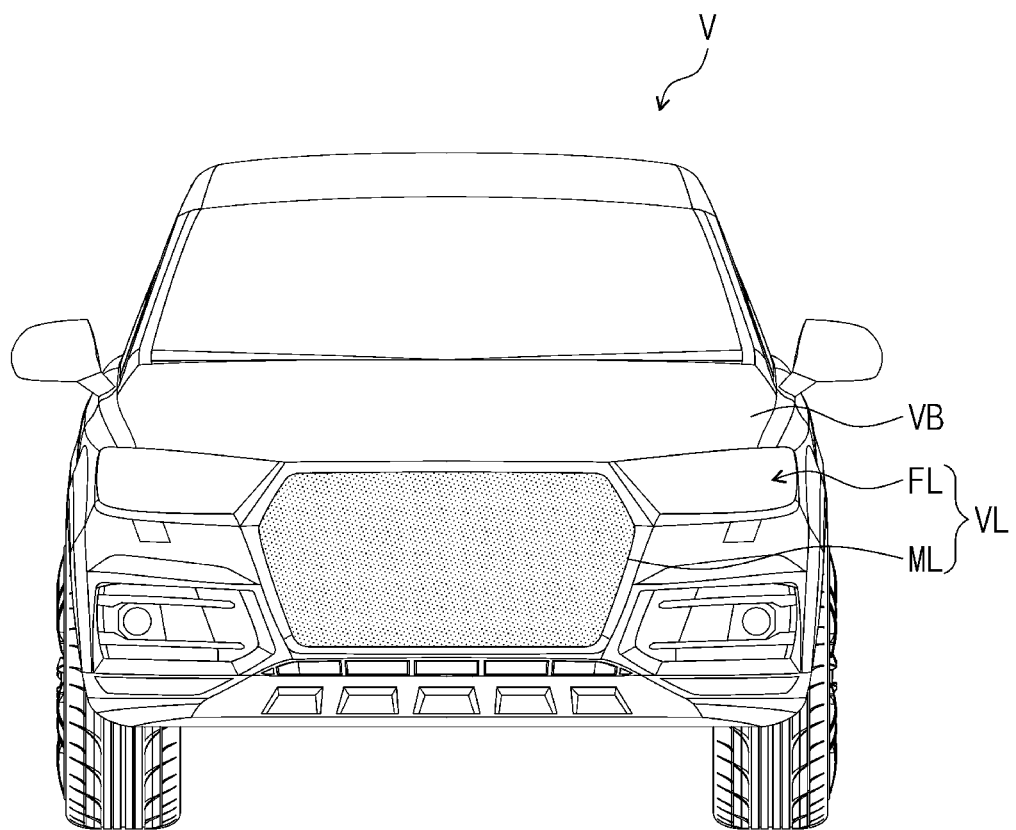
FIG. 1 is a front view illustrating a vehicle according to embodiments of the present disclosure.

Advantages and features of the present disclosure, and implementation methods thereof will be clarified through following embodiments described with reference to the accompanying drawings. The present disclosure may, however, be embodied in different forms and should not be construed as limited to the embodiments set forth herein. Rather, these embodiments are provided so that this disclosure will be thorough and complete, and will fully convey the scope of the present disclosure to those skilled in the art. Further, the present disclosure is only defined by scopes of claims. Like reference numerals refer to like elements throughout.

In the following description, the technical terms are used only for explaining a specific embodiment while not limiting the present disclosure. In this specification, the terms of a singular form may comprise plural forms unless specifically mentioned otherwise. The meaning of 'comprises' and/or 'comprising' specifies a component, a step, an operation and/or an element and does not exclude other components, steps, operations and/or elements.

The terms "first," "second," and the like are used merely to distinguish one element or component from another, so that a first element or component referred to herein may also be a second element or component within the technical idea of the present disclosure. Hereinafter, embodiments according to the present disclosure will be described in detail.

FIG. 1 is a front view illustrating a vehicle according to embodiments of the present disclosure.

Referring to FIG. 1, a vehicle V may include a vehicle body VB and a vehicle lamp VL. The vehicle body VB may refer to the remaining portion of the vehicle V other than the vehicle lamp VL. The vehicle lamp VL may be coupled to the vehicle body VB. The vehicle lamp VL may illuminate the path to secure a driver and passenger's sight. Alternatively, the vehicle lamp VL may provide information to people or other vehicles around the vehicle V. Accordingly, the vehicle lamp VL may be coupled to various positions of the vehicle body VB. For example, as illustrated in FIG. 1, the vehicle lamp VL may be coupled to a front end of the vehicle body VB. More specifically, the vehicle lamp VL may be coupled to a center of the front end and/or an edge of the front end of the vehicle body VB. When the vehicle lamp VL is coupled to the center of the front end of the vehicle body VB, the vehicle lamp VL may be referred to as a center lamp ML. When the vehicle lamp VL is coupled to the edge of the front end of the vehicle body VB, the vehicle lamp VL may be referred to as a head lamp FL. However, the embodiment of the present disclosure is not limited thereto, and the vehicle lamp VL may be coupled to other positions of the vehicle body VB.

Hereinafter, the vehicle lamp VL will be described in detail with reference to FIGS. 2 to 11.

Figure 2:
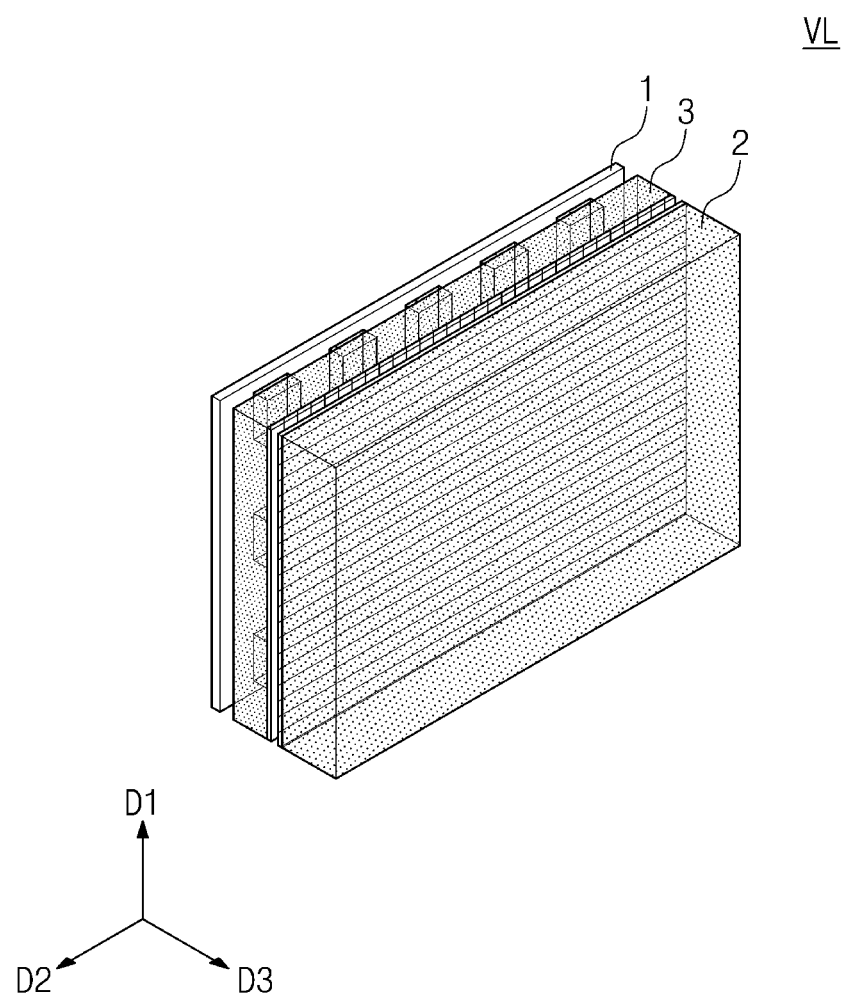
FIG. 2 is a perspective view illustrating a lamp for a vehicle according to embodiments of the present disclosure.
Figure 3:
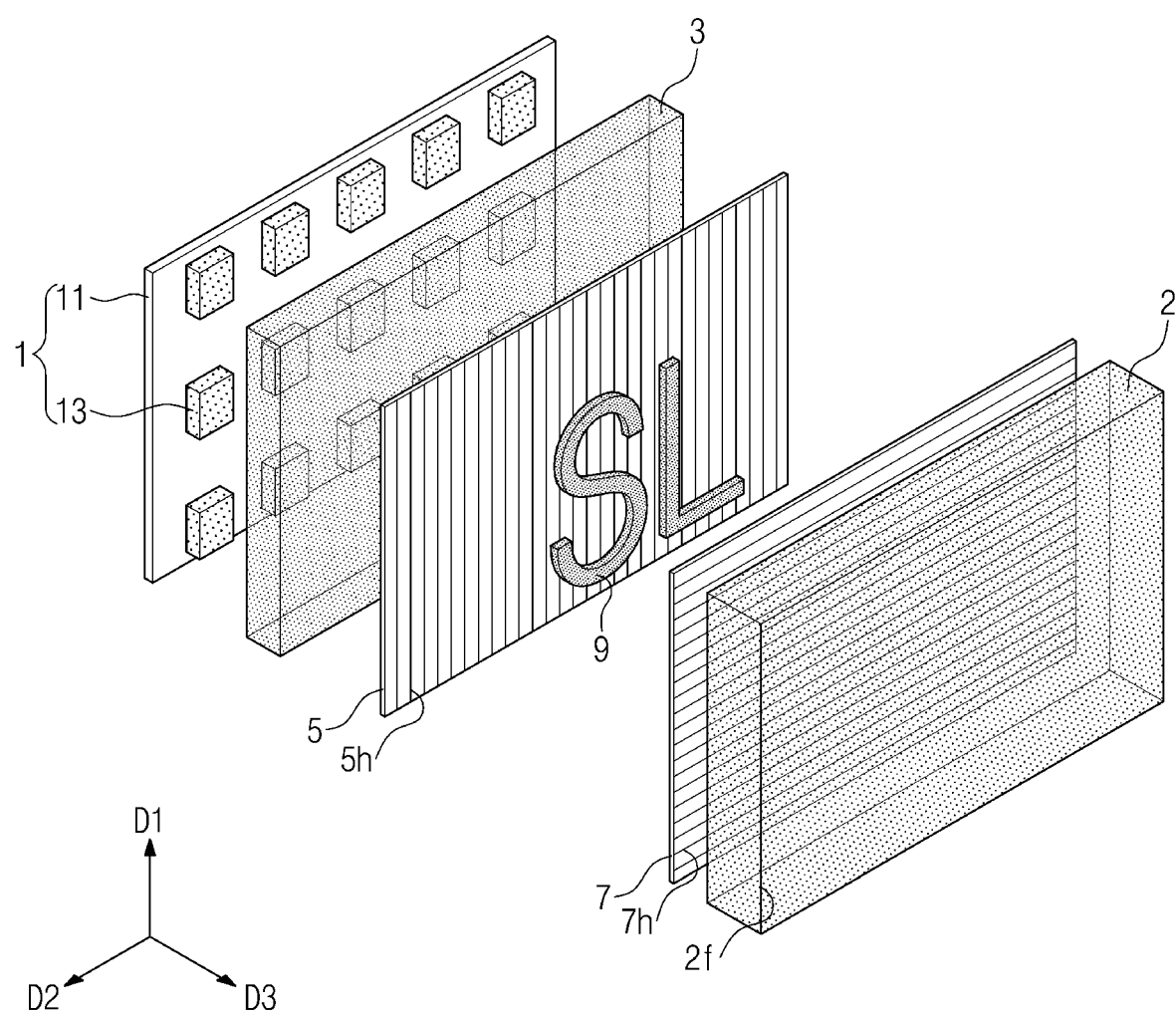
FIG. 3 is an exploded perspective view illustrating the lamp for the vehicle according to embodiments of the present disclosure.

FIG. 2 is a perspective view illustrating the lamp for the vehicle according to embodiments of the present disclosure, and FIG. 3 is an exploded perspective view illustrating the lamp for the vehicle according to embodiments of the present disclosure.

Hereinafter, a direction D1 will be referred to as a first direction, a direction D2 that intersects with the first direction D1 will be referred to as a second direction, and a direction D3 that intersects with both the first direction D1 and the second direction D2 will be referred to as a third direction. The first direction D1 may be referred to as a vertical direction. The second direction D2 may be referred to as a horizontal direction (e.g., a lateral direction). The third direction D3 may be referred to as a front and rear direction (e.g., a longitudinal direction). The first direction D1 and the second direction D2 may be perpendicular to each other. The second direction D2 and the third direction D3 may be perpendicular to each other. The third direction D3 and the first direction D1 may be perpendicular to each other. However, the embodiment of the present disclosure is not limited thereto.

Referring to FIGS. 2 and 3, the vehicle lamp VL may include a light source part 1, a diffuser lens 3, a first polarizing film 5, a second polarizing film 7, a protective lens 2, and a display object 9.

The light source part 1 may emit light toward the diffuser lens 3 or the like. For this, the light source part 1 may include a substrate 11 and a light source 13. The substrate 11 may include, for example, a printed circuit board (PCB). The substrate 11 may have a rectangular shape, but the present disclosure is not limited thereto. The substrate 11 may include components to control the light source 13. The substrate 11 may supply electrical power to the light source 13.

The light source 13 may be controlled by a signal transmitted from the substrate 11. The light source 13 may be coupled onto the substrate 11. More specifically, the light source 13 may be coupled onto a front surface of the substrate 11. The light source 13 may be supported by the substrate 11. The light source 13 may include a light emitting diode (LED), but the present disclosure is not limited thereto. The light source 13 may emit light. More specifically, the light source 13 may emit light in the third direction D3. Thus, the third direction D3 may be referred to as a light traveling direction. The light source 13 may be provided in plurality. As illustrated in FIG. 3, the plurality of light sources 13 may be spaced apart from one another in the first direction D1 and the second direction D2. A surface area of a region on which the light source 13 is disposed may be less than the surface area of the substrate 11. Hereinafter, the light source 13 will be described with regard to one light source. However, the description does not lose generality since other light sources may be configured similarly.

The diffuser lens 3 may be disposed in front of the light source part 1 in the light traveling direction. In other words, the diffuser lens 3 may be disposed in front of the light source part 1 along the light traveling direction. The diffuser lens 3 may transmit the light. In other words, the light emitted from the light source 13 may transmit through the diffuser lens 3. For this, the diffuser lens 3 may include a transparent material. More specifically, the diffuser lens 3 may include a material capable of transmitting the light emitted from the LED.

The light emitted from the light source 13 may be diffused while transmitting through the diffuser lens 3. More specifically, when the light emitted from the light source 13 proceeds in the third direction D3 to transmit through the diffuser lens 3, the light may be diffused in the first direction D1 and/or the second direction D2. A surface area of the diffuser lens 3 may be greater than the surface area of the region on which the plurality of light sources 13 are disposed. Thus, the diffuser lens 3 may diffuse the light emitted from all of the plurality of light sources 13. A front surface of the diffuser lens 3 may have a rectangular shape, but the present disclosure is not limited thereto. The diffuser lens 3 may include a lenticular lens.

The first polarizing film 5 may be disposed in front of the diffuser lens 3 in the light traveling direction. The first polarizing film 5 may include a first slit 5h. The first slit 5h may pass through the first polarizing film 5 in the third direction D3. The first slit 5h may extend in the first direction D1. As such, the first polarizing film 5 may be a vertical polarizing film. The first slit 5h may be provided in plurality. The plurality of first slits 5h may be spaced apart from one another in the second direction D2. However, hereinafter, for convenience, one first slit 5h will be described. Other first slits 5h may be configured similarly. Some light emitted from the light source 13 may pass through the first slit 5h. Some other light emitted from the light source 13 may not pass through the first polarizing film 5 where the first slit 5h is not defined. In other words, only the light component that is vertically polarized in alignment with the first slit 5h may transmit through the first polarizing film 5. A portion of the light that passes through the first slit 5h may transmit through the display object 9. Accordingly, a portion of the light emitted from the light source 13 that passes through the first slit 5h may pass through the display object 9 and may proceed toward the second polarizing film 7. A remaining portion of the light that passes through the first slit 5h may proceed toward the second polarizing film 7 without passing through the display object 9. Details on this process will be described later below.

The second polarizing film 7 may be disposed in front of the first polarizing film 5 in the light traveling direction. The second polarizing film 7 may include a second slit 7h. The second slit 7h may pass through the second polarizing film 7 in the third direction D3. The second slit 7h may extend in the second direction D2. As such, the second polarizing film 7 may be a horizontal polarizing film. The second slit 7h may be provided in plurality. The plurality of second slits 7h may be spaced apart from one another in the first direction D1. However, hereinafter, for convenience, one second slit 7h will be described. Other second slits 7h may be configured similarly. Some light emitted from the light source 13 may pass through the second slit 7h. Some other light emitted from the light source 13 may not pass through the second polarizing film 7 where the second slit 7h is not defined. In other words, only the light component that is horizontally polarized in alignment with the second slit 7h may transmit through the second polarizing film 7. The light that sequentially passes through the first slit 5h and the display object 9 may pass through the second slit 7h. The light that reaches the second polarizing film 7 without passing through the display object 9 after passing through the first slit 5h may not pass through the second slit 7h. Details on this process will be described later below.

The protective lens 2 may be disposed in front of the second polarizing film 7 in the light traveling direction. The protective lens 2 may include a transparent material. More specifically, the protective lens 2 may include a material capable of transmitting the light emitted from the LED. The protective lens 2 may protect the second polarizing film 7 and the like from an external impact, moisture, and/or foreign substances. The protective lens 2 may be spaced apart from the diffuser lens 3 in the third direction D3. The distance between the diffuser lens 3 and the protective lens 2 in the third direction D3 may be referred to as a first length. The protective lens 2 may have, for example, a planar front surface and a planar rear surface, as illustrated in FIG. 3. However, the embodiment of the present disclosure is not limited thereto, and the protective lens 2 may have other shapes. For example, the front and/or rear surface of the protective lens 2 may have a curved shape. However, the embodiment of the present disclosure is not limited thereto. In addition, the protective lens 2 may have other shapes that are suitable for vehicles.

The display object 9 may be disposed between the first polarizing film 5 and the second polarizing film 7. The display object 9 may include a transparent material. That is, the display object 9 may include a material capable of transmitting the light emitted from the LED. The light emitted from the light source 13 may be refracted and/or diffused while transmitting through the display object 9. More specifically, the light emitted from the light source 13 and transmitted through the first slit 5h may be refracted and/or diffused while transmitting through the display object 9. For this, the display object 9 may include polycarbonate (PC), polymethyl methacrylate (PMMA), or glass. However, the embodiment of the present disclosure is not limited thereto, and the display object 9 may include other materials. The light that sequentially passes through the first slit 5h and the display object 9 may pass through the second slit 7h. The light that reaches the second polarizing film 7 without passing through the display object 9 after passing through the first slit 5h may not be able to pass through the second slit 7h.

The display object 9 may include various shapes. More specifically, the display object 9 may have a three-dimensional (3D) shape. That is, the display object 9 may have a three-dimensional shape having a length (e.g., a thickness) in the third direction D3, which is equal to or greater than a predetermined value. For example, as illustrated in FIG. 3, the display object 9 may have a shape obtained by implementing a three-dimensional shape in the shape of a character. However, the embodiment of the present disclosure is not limited thereto, and the display subject 9 may have other shapes. Details thereof will be described later below with reference to FIGS. 10 and 11. A thickness of the display object 9 in the third direction D3 may be referred to as a second length. A difference between the first length and the second length may be about 0.1 mm to about 0.5 mm. By way of example, the difference between the first length and the second length may be about 0.3 mm. A surface area of the display object 9 may be less than the surface area of the diffuser lens 3. Therefore, light may be emitted to the entire display object 9.

Figure 4:
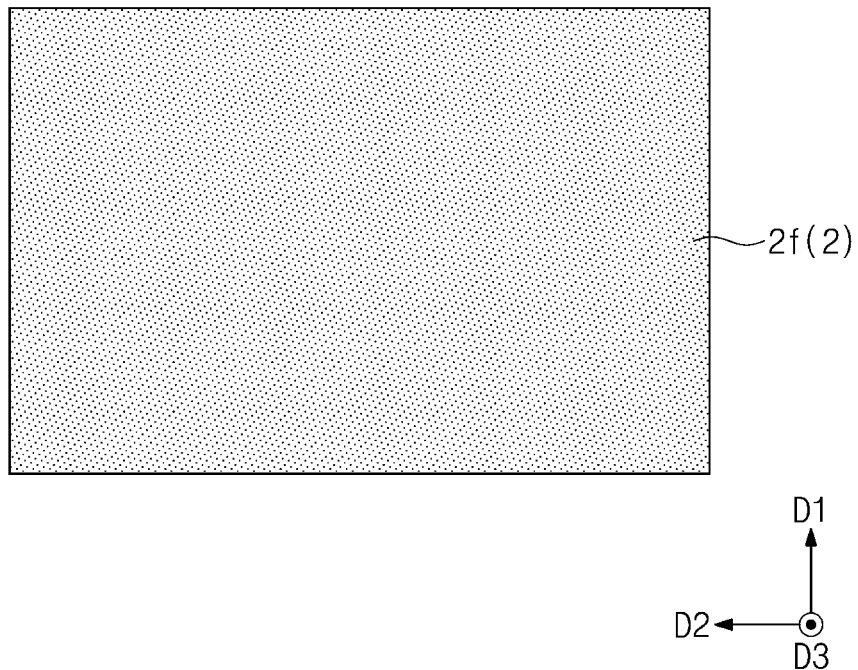
FIG. 4 is a front view illustrating a state in which the lamp for the vehicle is turned off according to embodiments of the present disclosure.

FIG. 4 is a front view illustrating a state in which the lamp for the vehicle is turned off according to embodiments of the present disclosure.

Referring to FIG. 4, the vehicle lamp VL may be in an off-state. More specifically, the vehicle lamp VL depicted in FIG. 4 may be in a state in which all of the plurality of light sources 13 (see FIG. 3) are turned off. When the vehicle lamp VL is viewed from the front in the state in which all of the plurality of light sources 13 are turned off, only a front surface 2f of the protective lens 2 may be observed. As such, in the state in which all of the plurality of light sources 13 are turned off, components behind the second polarizing film 7 may not be clearly visible from the exterior. More specifically, in the state in which all of the plurality of light sources 13 are turned off, the display object 9 (see FIG. 3) may not be clearly visible from the exterior.

Figure 5A:
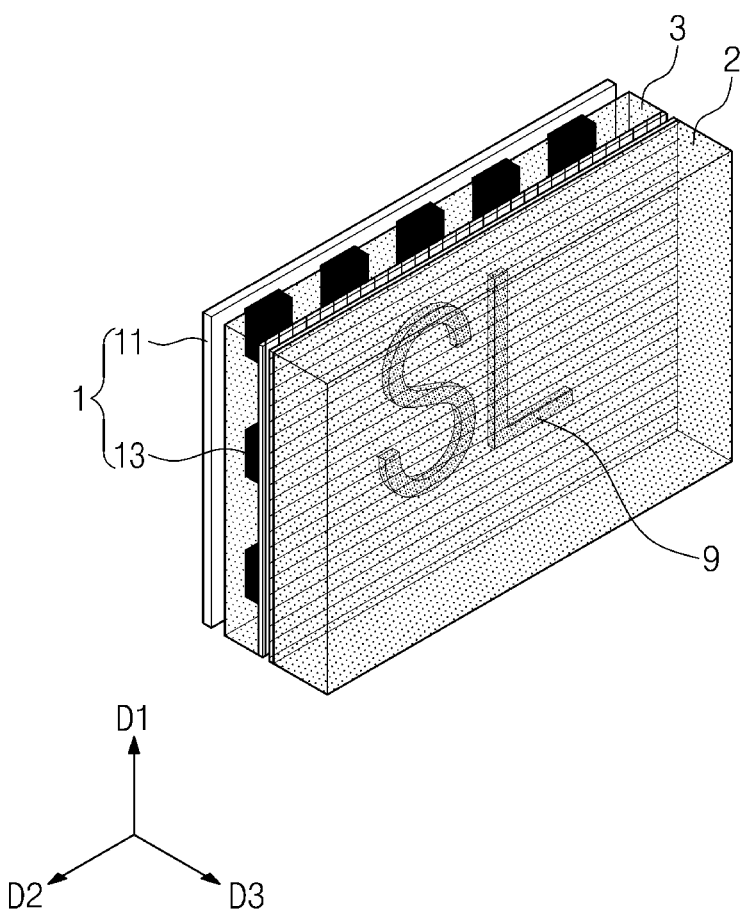
FIG. 5A is a perspective view illustrating a state in which the lamp for the vehicle is turned on according to embodiments of the present disclosure.
Figure 5B:
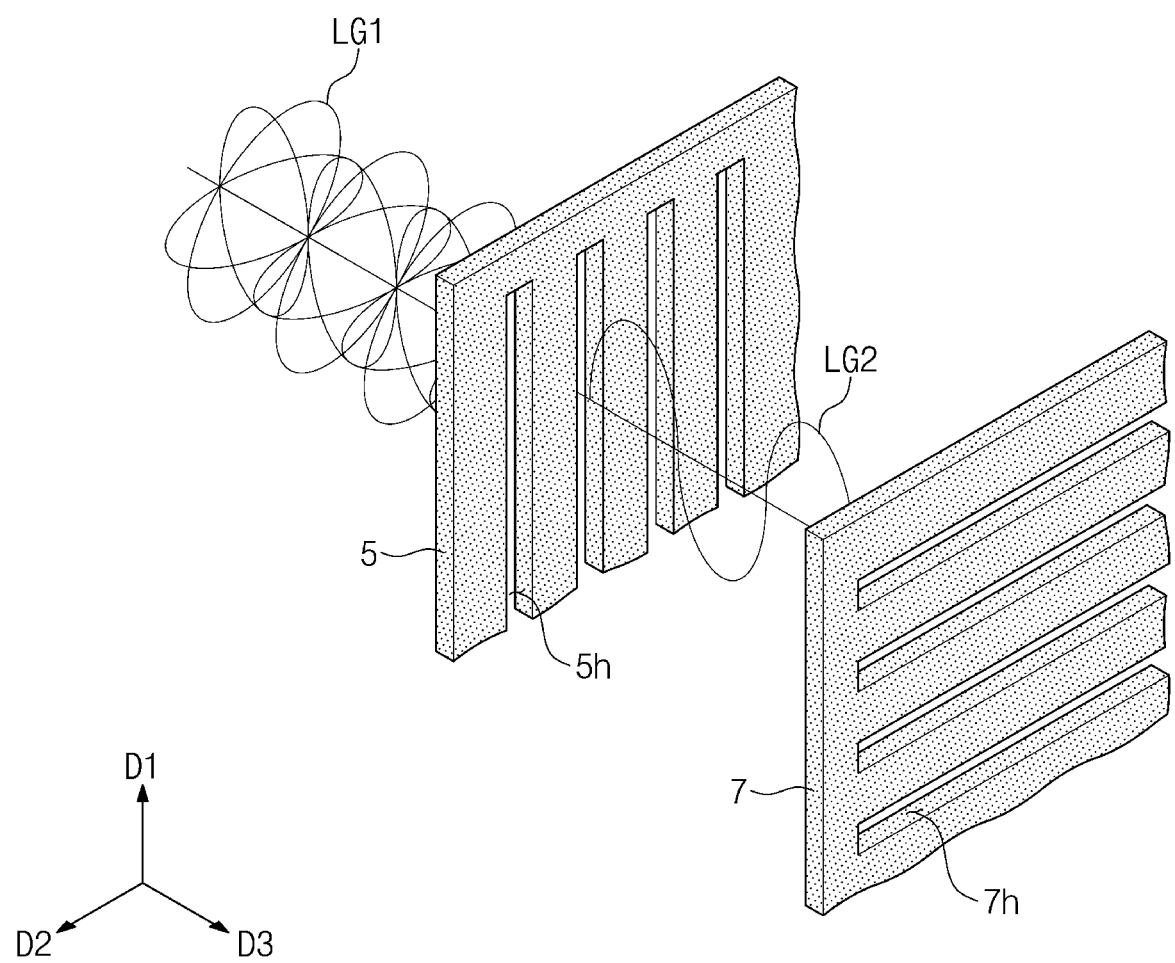
FIG. 5B is a perspective view illustrating light that passes through a polarizing film in the state in which the lamp for the vehicle is turned on according to embodiments of the present disclosure.
Figure 6:
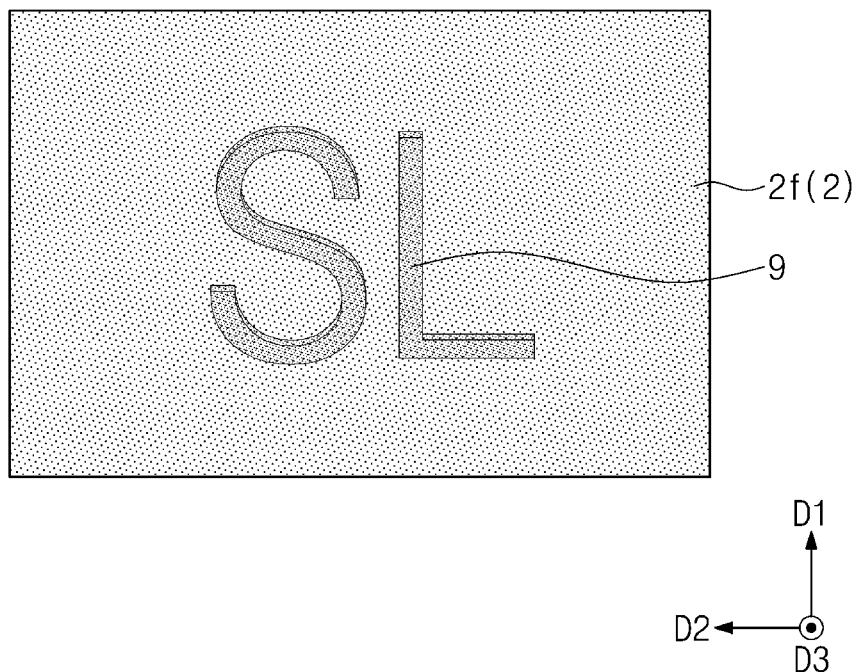
FIG. 6 is a front view illustrating a state in which the lamp for the vehicle is turned on according to embodiments of the present disclosure.

FIG. 5A is a perspective view illustrating a state in which the lamp for the vehicle is turned on according to embodiments of the present disclosure, FIG. 5B is a perspective view illustrating light that passes through the polarizing film in the state in which the lamp for the vehicle is turned on according to embodiments of the present disclosure, and FIG. 6 is a front view illustrating a state in which the lamp for the vehicle is turned on according to embodiments of the present disclosure.

Referring to FIGS. 5A, 5B and 6, the light source 13 may be turned on. When turned on, the light source 13 may emit light toward the diffuser lens 3. The light emitted from the light source 13 may transmit through the diffuser lens 3. The light that transmits through the diffuser lens 3 may be diffused. The light that transmits through the diffuser lens 3 may pass through the first polarizing film 5 (see FIG. 3). More specifically, light LG1 that transmits through the diffuser lens 3 may pass through the first slit 5h (see FIG. 3). A portion of the light LG2 that passes through the first slit 5h may pass through the display object 9 to reach the second polarizing film 7 (see FIG. 3). A portion of the light that passes through the display object 9 to reach the second polarizing film 7 may also pass through the second slit 7h (see FIG. 3). On the other hand, the other portion of the light LG2 that passes through the first slit 5h may reach the second polarizing film 7 without passing through the display object 9. The light that reaches the second polarizing film 7 without passing through the display object 9 may not pass through the second slit 7h (i.e., obstructed by the second polarizing film 7). Therefore, when the vehicle lamp VL is viewed from the exterior in a state in which the light source 13 is turned on, only the portion that corresponds to the display object 9 may be visible. The display object 9 may appear three-dimensionally. The display object 9 may appear as if it is floating in mid-air.

According to the vehicle lamp and the vehicle including the lamp according to embodiments of the present disclosure, various images may be selectively displayed. More specifically, in the state in which the light source is turned off, the display object may not be clearly visible from the exterior. If the display object is desired to be visible from the exterior, the light source may be turned on to allow the display object to be visible from the exterior. A desired image may be displayed simply by changing the display object. In addition, the display object may be observed three-dimensionally from the exterior.

According to the vehicle lamp and the vehicle including the same according to the embodiments of the present disclosure, the components other than the display object may be invisible from the exterior. That is, the two polarizing films having the slits having different directions may be used to allow the light that does not pass through the display object to be prevented from being emitted to the exterior of the vehicle lamp. Therefore, even when the light source is turned on, the light source may not be visible from the outside. The components other than the display object may be hidden so as to be invisible or substantially less visible from the exterior, and thus, the display object may be more effectively displayed.

According to the lamp for the vehicle and the vehicle including the same according to the embodiments of the present disclosure, the lamp may be manufactured with a lower cost. That is, only the light source, the two polarizing films, and the display object may be provided to display a selective/stereoscopically visible image.

Figure 7:
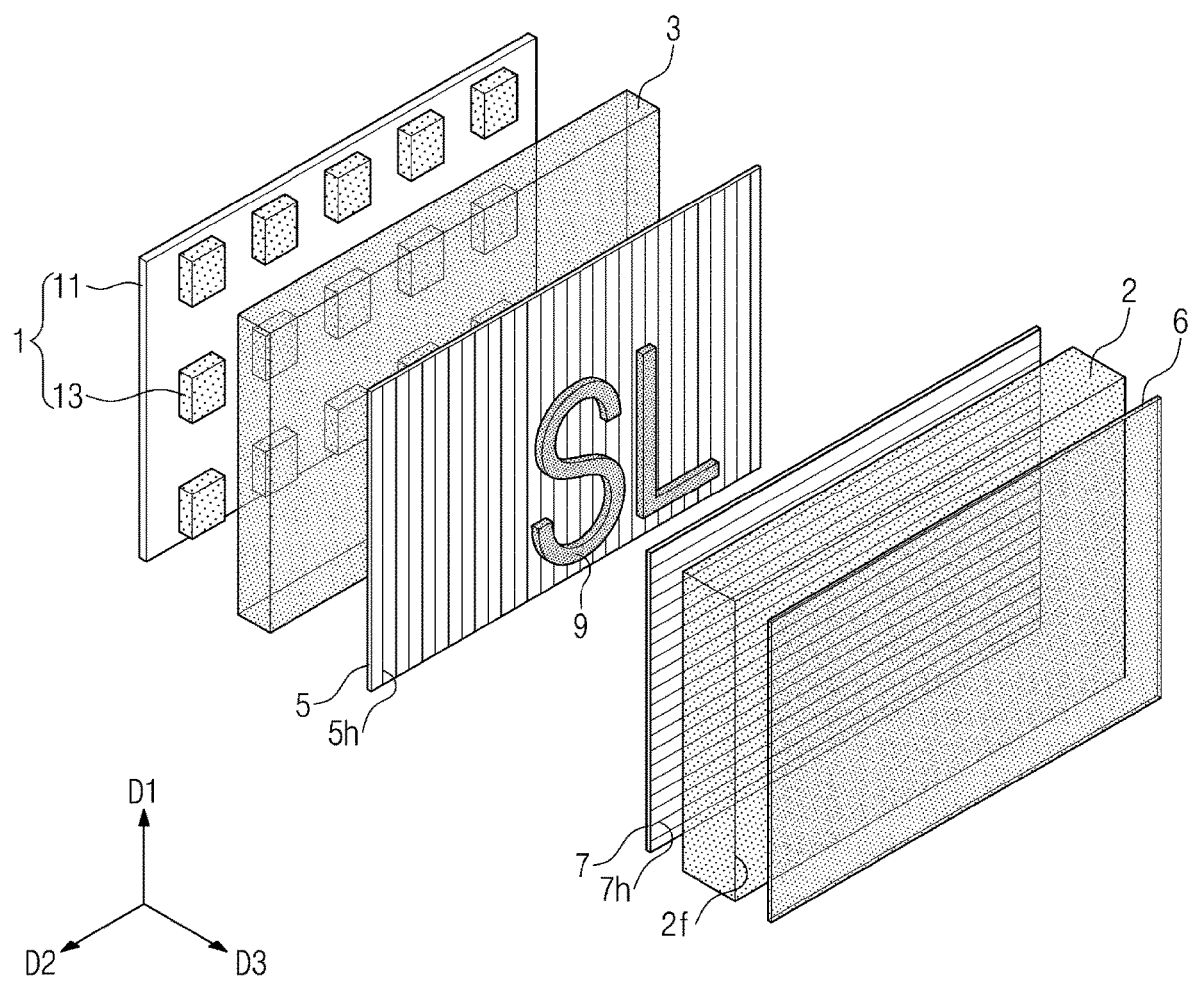
FIG. 7 is an exploded perspective view illustrating a lamp for a vehicle according to embodiments of the present disclosure.

FIG. 7 is an exploded perspective view illustrating a lamp for a vehicle according to embodiments of the present disclosure. Hereinafter, descriptions of contents substantially the same as or similar to those described with reference to FIGS. 1 to 6 may be omitted.

Referring to FIG. 7, a vehicle lamp VLa may further include a translucent film 6. The translucent film 6 may be disposed in front of the protective lens 2 in the light travel direction. The translucent film 6 may be coupled to a front surface 2f of the protective lens 2. In a state in which a light source 13 is turned off, a display object 9 may be significantly less visible from the exterior due to the translucent film 6.

According to the vehicle lamp and the vehicle including the same according to the embodiments of the present disclosure, in the state in which the light source is turned off, the display object may be obstructed from being visible from the exterior. Therefore, the light source may be turned on only when necessary to allow the display object to be displayed to the exterior. In the state in which the light source is turned off, only a front surface of the translucent film 6 may be seen from the exterior.

Figure 8:
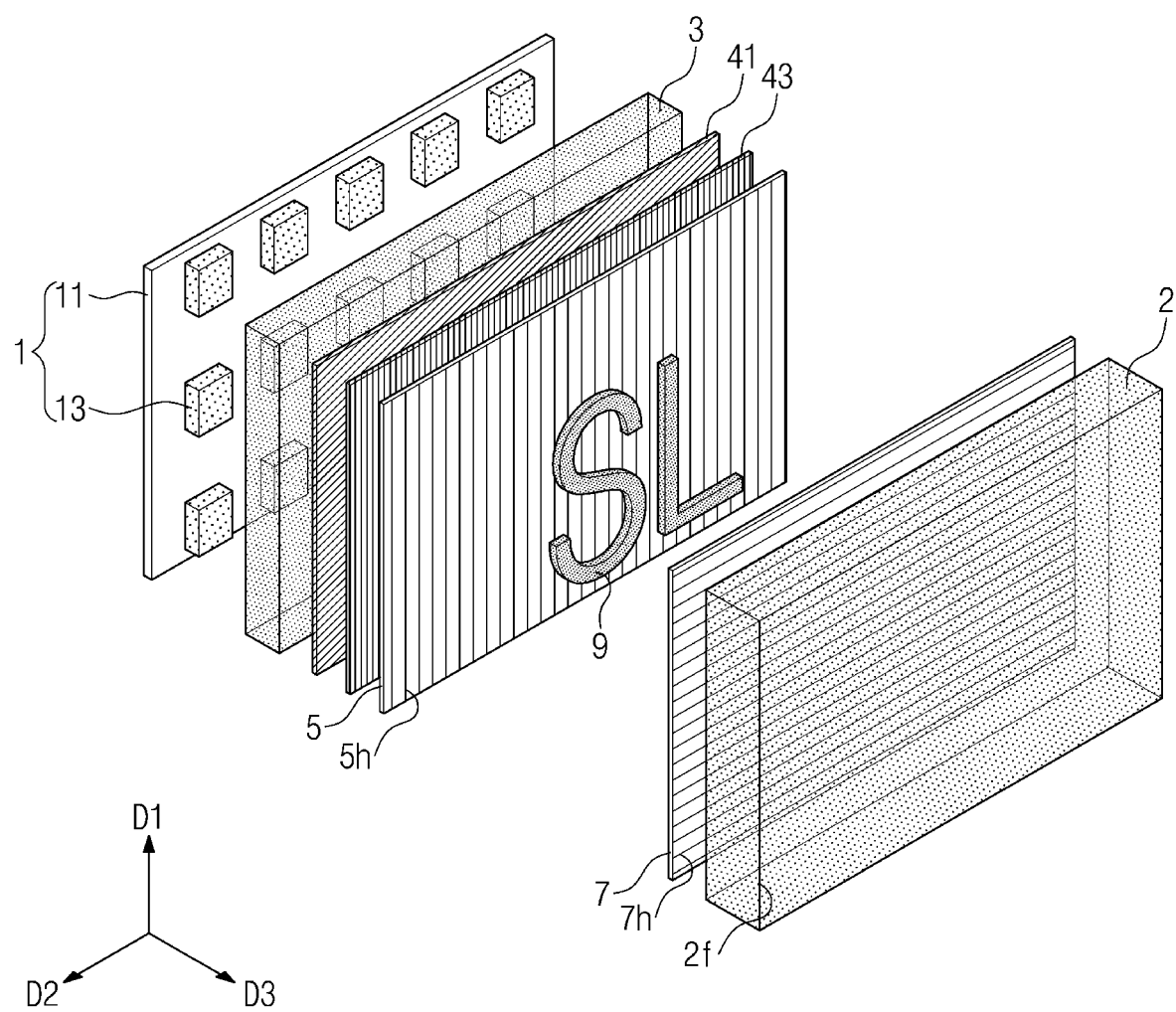
FIG. 8 is an exploded perspective view illustrating a lamp for a vehicle according to embodiments of the present disclosure.
Figure 9:
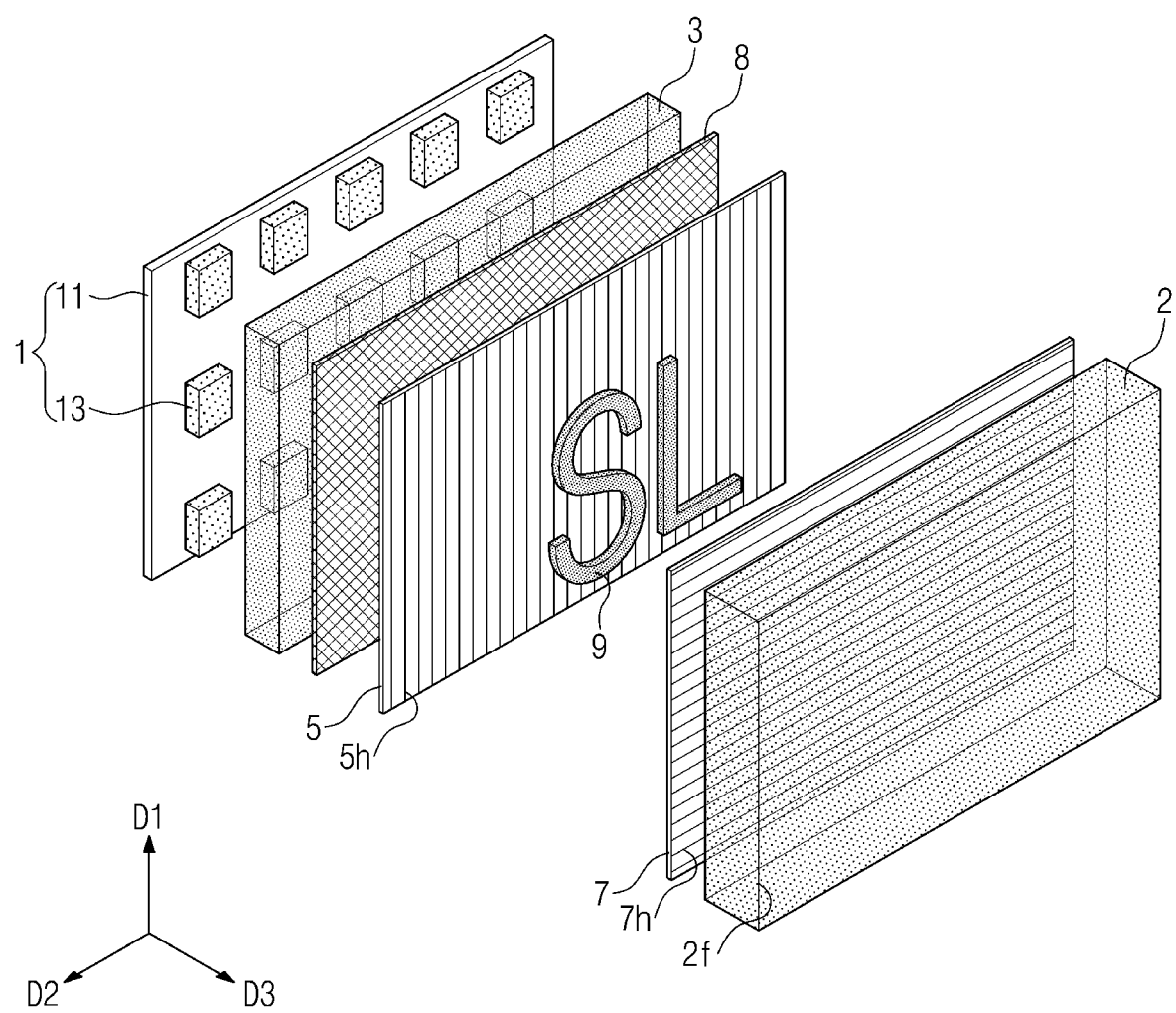
FIG. 9 is an exploded perspective view illustrating a lamp for a vehicle according to embodiments of the present disclosure.

FIG. 8 is an exploded perspective view illustrating a lamp for a vehicle according to embodiments of the present disclosure, and FIG. 9 is an exploded perspective view illustrating a lamp for a vehicle according to embodiments of the present disclosure. Hereinafter, descriptions of contents substantially the same as or similar to those described with reference to FIGS. 1 to 7 may be omitted.

Referring to FIG. 8, a vehicle lamp VLb may further include a first privacy film 41 and a second privacy film 43.

The first privacy film 41 may be disposed between the diffuser lens 3 and the first polarizing film 5. The first privacy film 41 may include a horizontal protection film. That is, the first privacy film 41 may obstruct light that is introduced from a side and may pass light that is introduced from a front side. More specifically, the first privacy film 41 may prevent the light that is incident parallel to a plane defined by the third direction D3 and the second direction D2 and angled at an angle of about 30 degrees or more with respect to the third direction D3. For this, the first privacy film 41 may include a micro louver film and/or a polarizing film.

The second privacy film 43 may be disposed between the first privacy film 41 and the first polarizing film 5. The second privacy film 43 may include a vertical protection film. That is, the second privacy film 43 may obstruct light that is introduced from above or below and may pass light that is introduced from the front side. More specifically, the second privacy film 43 may prevent the light that is incident parallel to a plane defined by the third direction D3 and the first direction D1, and angled at an angle of about 30 degrees or more with respect to the third direction D3. For this, the second privacy film 43 may include a micro louver film and/or a polarizing film.

Referring to FIG. 9, a vehicle lamp VLc may include a single privacy film 8 instead of duel privacy films 41 and 43. The single privacy film 8 may have an effect of the first privacy film 41 and the second privacy film 43 combined.

According to the vehicle lamp and the vehicle including the lamp according to embodiments of the present disclosure, the privacy film may be provided to obstruct light that is introduced in from the exterior. The vehicle lamp may be seen only by the light source of the light source part. More specifically, since external light introduced from the side, the upper side, and/or the lower side is blocked, the display object or the like may be seen only by the light source disposed behind. Thus, the display object may be observed with substantially uniform brightness even when viewed from any angles. In addition, areas other than the display object may be displayed as a black background.

Figure 10:
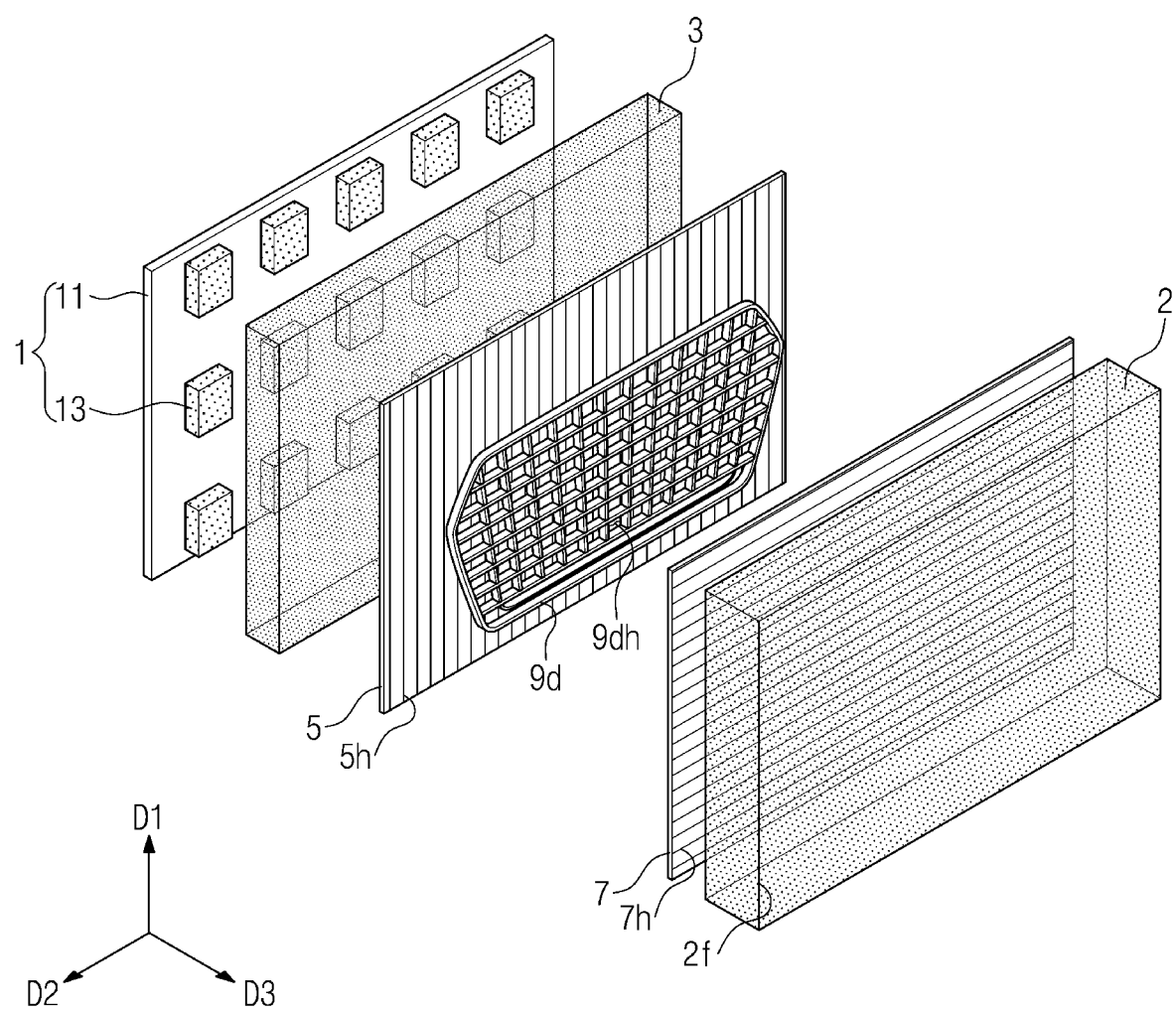
FIG. 10 is an exploded perspective view illustrating a lamp for a vehicle according to embodiments of the present disclosure.

FIG. 10 is an exploded perspective view illustrating a lamp for a vehicle according to embodiments of the present disclosure. Hereinafter, descriptions of contents substantially the same as or similar to those described with reference to FIGS. 1 to 9 may be omitted.

Referring to FIG. 10, a vehicle lamp VLd may include a display object 9d. Unlike the display object illustrated in FIG. 3, the display object 9d may have a grill structure. That is, the display object 9d may include an aperture 9dh. More specifically, the display object 9d may include an aperture 9dh that passes through the display object 9d in the third direction D3. The aperture 9dh may be provided in plurality. The plurality of apertures 9dh may be spaced apart from one another in the first direction D1 and/or the second direction D2. The display object 9d provided with the plurality of apertures 9dh may have a shape and pattern similar to a vehicle front grill.

Figure 11:
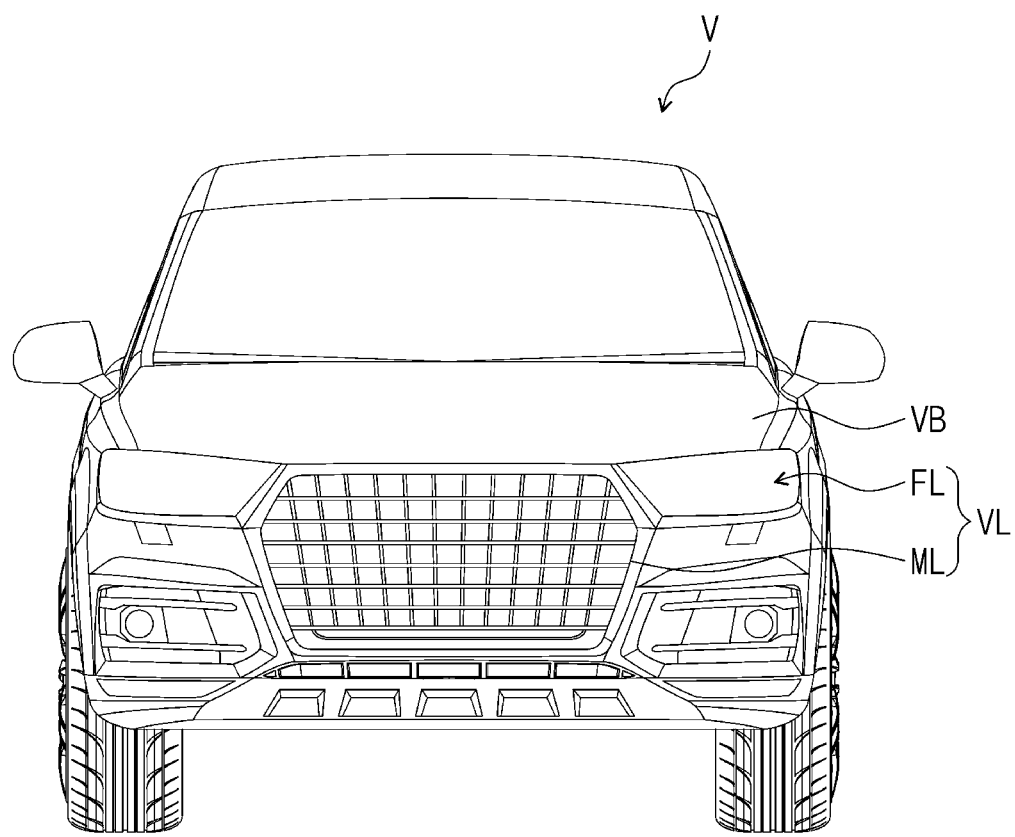
FIG. 11 is a front view illustrating the lamp for the vehicle applied to the vehicle according to embodiments of the present disclosure.

FIG. 11 is a front view illustrating the lamp for the vehicle when applied to the vehicle according to embodiments of the present disclosure.

Referring to FIG. 11, the vehicle lamp VL may be coupled to, for example, a center of the front end of the vehicle body VB. That is, the vehicle lamp VL may be implemented as a center lamp ML. The vehicle lamp VL may include the display object 9d (see FIG. 10) having the grill structure as illustrated in FIG. 10. Thus, when the light source 13 (see FIG. 10) is turned on, the display object 9d having the grill structure may be visible from the exterior.

According to the vehicle lamp and the vehicle including the lamp according to embodiments of the present disclosure, the grill structure may be simulated and displayed so as to be visible from the exterior of the vehicle. When the vehicle lamp is applied to an electric vehicle or the like, a similar external appearance may be achieved as an internal combustion engine vehicle.

According to the lamp for the vehicle and the vehicle including the same according to the embodiments of the present disclosure, the various images may be selectively displayed.

According to the lamp for the vehicle and the vehicle including the same according to the embodiments of the present disclosure, the desired images may be displayed in three-dimension.

According to the lamp for the vehicle and the vehicle including the same according to the embodiments of the present disclosure, only the desired images may be displayed, and other internal components such as the light source and the lens may be hidden.

According to the lamp for the vehicle and the vehicle including the same according to the embodiments of the present disclosure, the lamp may be manufactured at a lower cost.

The effects of the present disclosure are not limited to those that are aforementioned, but other effects not described herein will be clearly understood by those skilled in the art from the present disclosure.

Although the embodiment of the present disclosure is described with reference to the accompanying drawings, those with ordinary skill in the technical field of the present disclosure pertains will be understood that the present disclosure can be carried out in other specific forms without changing the technical idea or essential features. Thus, the above-disclosed embodiments are to be considered illustrative and not restrictive.

What is claimed is:

1. A lamp for a vehicle, comprising:
   a light source part comprising a plurality of light sources;
   a diffuser lens disposed in front of the light source part in a light traveling direction;
   a first polarizing film disposed in front of the diffuser lens in the light traveling direction;
   a second polarizing film disposed in front of the first polarizing film in the light traveling direction;
   a display object disposed between the first polarizing film and the second polarizing film; and
   a protective lens disposed in front of the second polarizing film in the light traveling direction,
   wherein the first polarizing film includes a plurality of first slits that extend in a first direction, and
   wherein the second polarizing film includes a plurality of second slits that extend in a second direction different from the first direction.

2. The lamp of claim 1, wherein each of the plurality of light sources comprises a light emitting diode (LED).

3. The lamp of claim 1, wherein the light source part further comprises a substrate that supports the plurality of light sources, and
   wherein the plurality of light sources are disposed to be spaced apart from one another on the substrate in the first direction and the second direction.

4. The lamp of claim 1, wherein the diffuser lens comprises a lenticular lens.

5. The lamp of claim 1, wherein the plurality of first slits are disposed to be spaced apart from one another in the second direction, and
   wherein the plurality of second slits are disposed to be spaced apart from one another in the first direction.

6. The lamp of claim 1, wherein the display object comprises polycarbonate (PC), polymethyl methacrylate (PMMA), or glass.

7. The lamp of claim 1, further comprising a translucent film disposed in front of the protective lens in the light traveling direction.

8. The lamp of claim 1, wherein the display object includes a vehicle front grill structure, and
wherein the vehicle front grill structure includes a plurality of apertures that pass through the display object in a third direction that is perpendicular to the first direction and the second direction.

9. The lamp of claim 8, wherein the protective lens is spaced apart from the diffuser lens in the third direction by a first length,
wherein a thickness of the display object in the third direction is equal to a second length, and
wherein a difference between the first length and the second length is about 0.1 mm to about 0.5 mm.

10. The lamp of claim 1, wherein the diffuser lens has a surface area greater than a surface area of a region on which the plurality of light sources are disposed.

11. The lamp of claim 1, wherein the display object has a surface area less than a surface area of the diffuser lens.

12. The lamp of claim 1, further comprising a first privacy film disposed between the diffuser lens and the first polarizing film, and
wherein the first privacy film comprises a horizontal protective film.

13. The lamp of claim 12, further comprising a second privacy film disposed between the diffuser lens and the first privacy film,
wherein the second privacy film comprises a vertical protective film.

14. A lamp for a vehicle, comprising:
a light source part comprising a light source;
a diffuser lens disposed in front of the light source part in a light traveling direction;
a first polarizing film disposed in front of the diffuser lens in the light traveling direction, the first polarizing film including a plurality of first slits that extend in a first direction;
a second polarizing film disposed in front of the first polarizing film in the light traveling direction, the second polarizing film including a plurality of second slits that extend in a second direction different from the first direction; and
a display object disposed between the first polarizing film and the second polarizing film,
wherein the display object includes a vehicle front grill structure that includes a plurality of apertures that pass through the display object in a third direction that is perpendicular to the first direction and the second direction.

15. The lamp of claim 14, wherein the plurality of apertures are disposed to be spaced apart from one another in the first direction and the second direction.

16. A vehicle comprising:
a vehicle body; and
a lamp for a vehicle, which is coupled to the vehicle body,
wherein the lamp for the vehicle comprises:
a light source part comprising a light source;
a diffuser lens disposed in front of the light source part in a light traveling direction;
a first polarizing film disposed in front of the diffuser lens in the light traveling direction, the first polarizing film including a plurality of first slits that extend in a first direction;
a second polarizing film disposed in front of the first polarizing film in the light traveling direction, the second polarizing film including a plurality of second slits that extend in a second direction different from the first direction; and
a display object disposed between the first polarizing film and the second polarizing film.

17. The vehicle of claim 16, wherein the lamp for the vehicle is coupled to a front end of the vehicle body.

\* \* \* \* \*